Jan. 7, 1969  G. B. BOETTNER  3,420,653
GLASS MELTING FURNACE

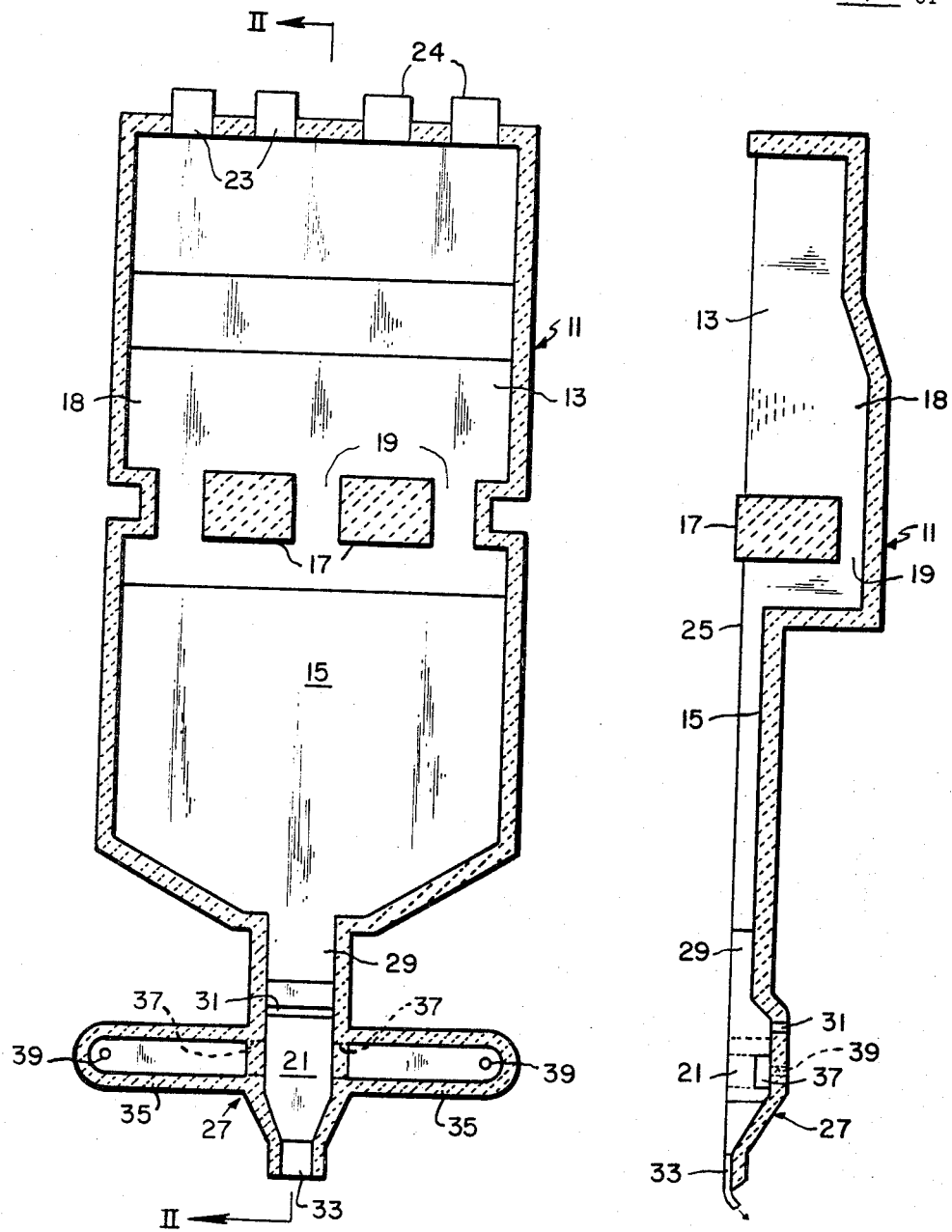

Filed March 8, 1965  Sheet 2 of 2

INVENTOR.
George B. Boettner
BY
ATTORNEY

United States Patent Office 3,420,653
Patented Jan. 7, 1969

3,420,653
GLASS MELTING FURNACE
George B. Boettner, Corning, N.Y., assignor to Corning Glass Works, Corning, N.Y., a corporation of New York
Filed Mar. 8, 1965, Ser. No. 437,830
U.S. Cl. 65—335    4 Claims
Int. Cl. C03b *5/22;* C03b *3/00*

ABSTRACT OF THE DISCLOSURE

A glass-melting furnace comprising a deep melting zone and a shallow refining zone separated from the melting zone by a bridgewall. A cooling channel communicates with the refining zone and is provided with a drain slot in its bottom wall and an overflow channel and comunicates by means of submerged throats with a plurality of forehearths.

---

This invention relates to a new and improved method of and apparatus for melting glass. More particularly, this invention pertains to a new concept of glass furnace design which increases potential output of the unit as well as decreases its glass holding capacity. It is a "zoned" furnace with each zone designed to do a specific phase of a melting process.

In known continuous glass melting processes carried on in relatively large tanks, a complex combination of melting of batch materials, eliminating gas bubbles created in the fusion process, and mixing to promote homogenization of the melted glass is evident. It is present practice, in most furnaces, to perform these operations in the same chamber of a glass melting tank. By adjusting operating conditions it is possible to strike a balance which keeps the melting process in the rear of the tank and the gas removal or fining in the forward part of the tank. Mixing is promoted throughout the tank by natural convection currents. If operating conditions go out of control, these same convection currents, which are desirable for mixing, move unmelted batch into the fining zone of the chamber which results in bad glass at the forehearth.

A conventionally designed glass furnace involves a melting end and a refining or working end separated by a bridgewall containing at least one throat connecting the two chambers. Typically, the length of the melting chamber is approximately twice the width of the melting chamber and the depth of the melting chamber is in the range of from 2½ to 5 feet.

Raw batch is normally introduced through a backwall by filling machines, and snakes or mounds of batch often result which float on the surface toward the bridgewall. A generally backward surface current, developed by a thermal dam or hot spot near the central region of the tank, opposes the thrust of the filling machines and resulting forward flow of the glass. However, at high fill rates, a very delicate balance exists, and an operator of the tank may have difficulty confining unmelted batch to the rear half of the tank. If batch does "get away," the glass quality is adversely affected because there has been insufficient time to completely melt and fine the glass.

Superimposed on the general forward movement of the glass in the tank are other currents induced by convection and surface tension forces. The result is a pattern of flow which may vary not only from tank to tank and glass to glass, but from time to time with the same glass and tank. Therefore, in present operations, finding and maintaining a good furnace schedule is not a simple procedure.

Tracer experiments have shown that some glass passes through the tank when no more than 25% of the glass holding capacity of the tank has been withdrawn. This means that some areas within the tank are relatively stagnant while others are very active.

The glass passes from the melting region through a bridgewall throat into what is often called the refining end. However, the temperature is reduced in this zone for glass conditioning purposes, so in reality such zone is an inefficient finer, although some small gaseous inclusions may be redissolved in the glass at this point. Present tanks actually have a relatively unengineered cooling and distribution zone, which is the outgrowth of the days when handshops gathered glass from this chamber.

Although it is not unique for glass tanks to be deep, or for them to be shallow, it is unique for them to have a deep premelting zone and a shallow fining zone separated by a bridgewall with single or multiple throats. It becomes more unique when combined with a front end which is designed to remove off-composition glass flowing on the tank bottom or scum flowing on the surface so that the best glass is reliably delivered to the forehearth.

The present invention utilizes a zoned type of furnace, with each zone designed to perform a specific function. New techniques are combined to produce an improved glass furnace.

It thus has been an object of the present invention to provide a novel glass melting furnace construction which not only increases output per unit area but also decreases previously required glass holding capacity.

An additional object of the present invention has been to increase melting rates with improved and more stable glass quality, making possible lower melting costs per pound of product produced.

Another object of the present invention has been to increase melting rates with less melting area required for a maximum pull rate.

A further object of the present invention has been to increase melting rates with a shorter tank turnover time wherein, tank turnover time substantially equal to tank holding capacity divided by the maximum pull rate.

Another object to the present invention has been to increase the percentage of the tank holding capacity which is withdrawn during the time it takes for a tracer to move through the tank; that is, tracer time divided by turnover time.

A still further object of the present invention is to enable glass changes to be made more rapidly and require a shorter drain time.

A further object of the present invention is to increase fill rates, thus glass changes can be made more rapidly, because glass will not enter the fining zone until the tank is nearly full.

Another object of the present invention is to minimize the importance of superstructure temperature distribution.

An additional object of the present invention is to eliminate the need for a "hot spot" thermal dam.

A still further object of the present invention is to decrease volatilization and increase the surface velocity of the glass in the fining zone.

A still further object of the present invention is to reduce sideblock refractory required in the fining zone and thus promote a monolithic bottom and sidewall construction.

Other objects and advantages of the present invention will be shown in the following detailed description of a preferred embodiment thereof illustrated in the accompanying drawings in which:

FIG. 1 is a somewhat schematic sectional plan view of a glass melting furnace embodying a shallow fining zone and a distribution zone in accordance with the present invention.

FIG. 2 is a schematic sectional view in elevation taken along line 2—2 of the glass melting furnace of FIG. 1.

Figure 3:
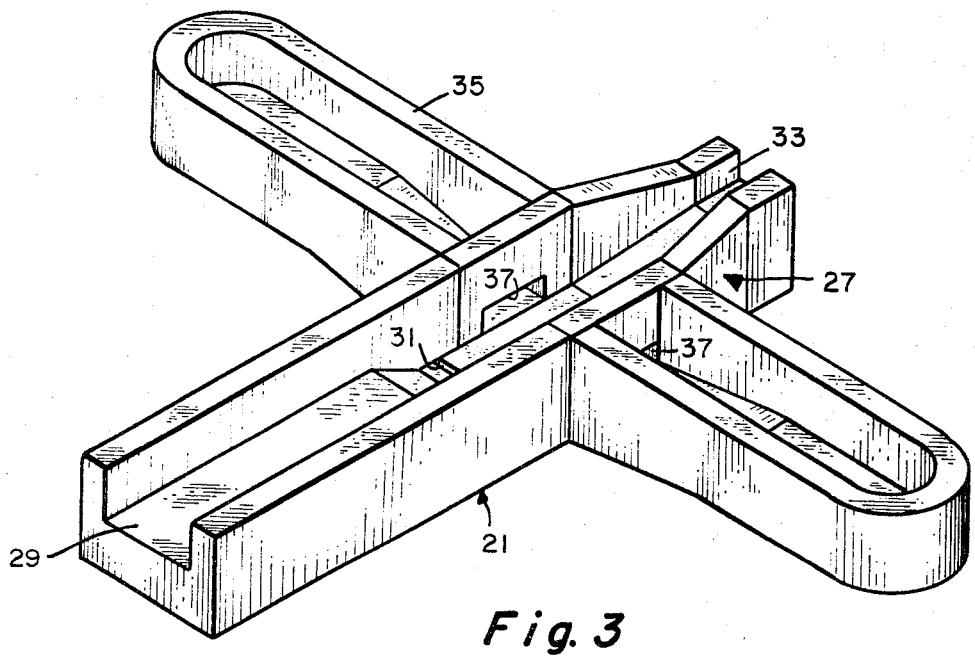
FIG. 3 is a perspective view illustrating one form of a glass furnace distribution zone in accordance with the present invention.

Referring now to the drawings, a tank 11 is shown with a premelt or melting zone 13 and a fining zone 15, separated by a bridgewall 17. The bridgewall 17 contains a plurality of throats 19 which extend between and provide passage for molten glass between the premelt zone 13 and the fining zone 15. Although multiple throats 19 are shown, the invention is equally applicable to a single throat bridgewall.

Extending from one end of fining zone 15 is a distribution and cooling zone 21. The tank 11 may be supported in any customary manner.

Raw batch material may be charged into the premelt zone 13 of the tank in several ways, such as a screw-type filling machine. The raw materials of a desired glass composition enter through a plurality of charging inlets 23 fed by suitable filling machines 24.

The purpose of the premelt zone 13 is to apply energy to the introduced raw materials so that crystalline ingredients are converted into an amorphous solution. Since the density of the molten glass is greater than that of the unmelted batch, a basic direction of material flow is from top to bottom, particularly in view of the fact that the raw materials are necessarily introduced above glass line 25. The molten glass is withdrawn at the bottom of premelt zone 13 through one or more throats 19, depending upon the tank width.

To those familiar with glass furnaces, this type of premelt is known as a deep zone. Although any type of heating can be considered, for maximum melting rates, electrical energy may be used advantageously. The electrical energy can be applied either alone or in combination with combustion over the glass.

The bridgewall 17, transversing the tank 11 between the premelting zone 13 and fining zone 15, limits the forward movement of unmelted batch, and only permits molten batch materials to flow into fining zone 15.

The purpose of the fining zone 15 is to remove any remaining gaseous inclusions from the molten batch delivered thereto. The fining zone 15 of the present invention is provided with a novel structural configuration which produces, in effect, a nearly uniform horizontal flow front or velocity profile. The configuration produces a shallow fining zone, with the desired width to depth ratio being 10:1 or greater. When a high width to depth ratio cannot be physically accommodated, the velocity profile can be improved by contouring the tank bottom. That is, the glass depth in the center may be reduced to approximately 70% of glass depth near the sidewall. A similar effect can be obtained by using partial weirs to reduce the velocity of the fastest moving glass in the center of the tank, so as to achieve a uniform flow front. It is important that a high percentage of the surface glass leaves the fining zone 15 with a uniform residence time within such zone.

A further novel feature of the instant invention is the elimination of the conventional bridgewall and throat located at the distribution end of fining zone 15. Any surface scum which develops in the fining zone is allowed to pass on to a distribution and cooling zone 21.

Glass flows from the fining zone 15 into distributor 27 through an open cooling channel 29. A suitable barrier may be provided to minimize the flow of gasses between the zones.

A drain slot 31 in the bottom of open cooling channel 29 is situated upstream of distributor 27. The drain slot 31 is designed to remove off-composition glass flowing on the tank bottom.

In a preferred embodiment an overflow 33 is situated at a downstream position of distributor 27. Any surface scum which develops in the shallow fining zone is allowed to pass on to the distribution zone where it will go to an overflow, such as 33.

Figures 4, 5:
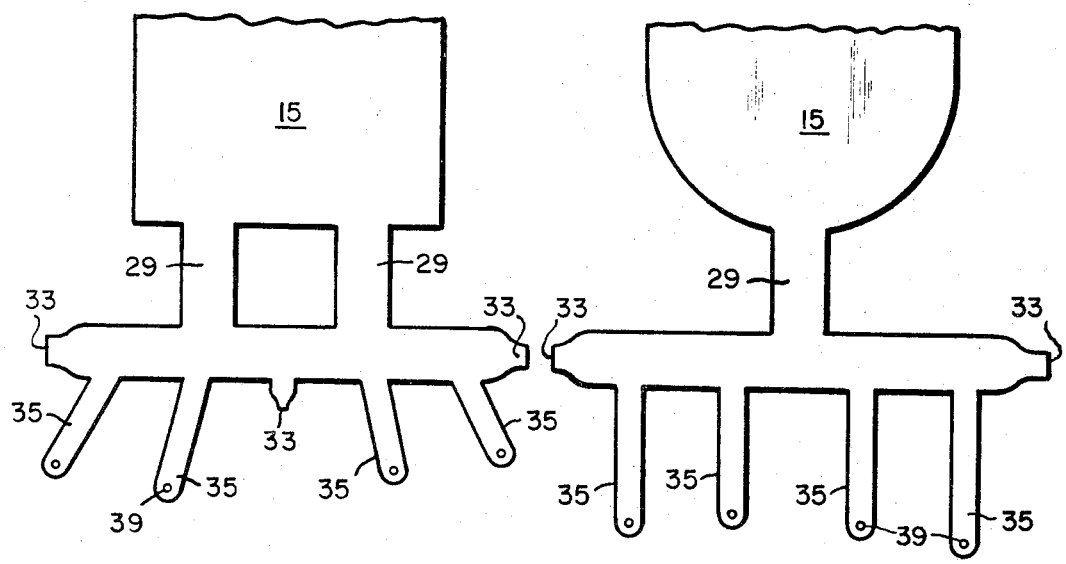
FIG. 4 is a schematic plan view of an alternate embodiment illustrating a distribution system.
FIG. 5 is a schematic plan view of a further embodiment of a distribution zone.

More than one cooling channel 29 and overflow 33 may be provided, as schematically shown in FIG. 4. FIGURES 4 and 5 schematically show alternate embodiments for the location of cooling channels, overflows 33 and forehearth 35.

A submerged throat 37 shown in FIGS. 2 and 3, provides a communicating path to each of the forehearths 35 from distributor 27.

As shown in the drawings the submerged throat is preferably located downstream of the drain slot 31 and upstream of the overflow 33.

As particularly shown in FIG. 3, the distributor 27 has a high length to width ratio, with an effective overflow 33 at an exit end and the drain slot 31 in the bottom near its entrance. Submerged throats 37 leading to the forehearths 35 are positioned in the flow path between drain slot 31 and overflow 33. The depth of the distributor in the vicinity of the drain slot and submerged throats may be relatively greater than the depth of the finer 15; however, it remains relatively shallow when compared to the melting zone 13. The actual depth utilized will, of course, be dependent upon the particular glass viscosity and desired flow rate.

The operation of the disclosed glass melting furnace is as follows. Raw batch is suppied to the melting zone 13, and having a density less than that of the molten glass, floats on the surface. The raw batch being a fairly good insulator significantly reduces the amount of energy that can be efficiently transferred to the glass bath from an overhead combustion zone. Electrical energy therefore can be introduced directly into the glass, where it is most needed, and is very effective in increasing the solution rate of the raw materials. In a typical case the raw batch is introduced through a charging inlet 23 in the back wall of tank 11 by a filling machine 24.

In the vicinity of the bridgewall 17, the tank is deepened laterally to provide a collecting chamber or canal 18 where glass will pass downwardly and forwardly through the throats 19 into the fining zone 15.

A theoretical study of the fining zone 15 indicates that the length of the horizontal path required for a seed to reach the glass surface at the glass line 25 is independent of the tank depth and vertical velocity profile (assuming constant viscosity). A formula which has been derived to express this phenomena is $$L = .016 \times 10^{-6} \frac{Q\eta}{\omega \rho^2 d^2}$$

In this formula L is horizontal distance in feet, Q is glass pull in pounds per day, $\eta$ is glass viscosity in poise, W is the tank width in feet, $\rho$ is glass specific gravity, and $d$ is seed diameter in inches.

The foregoing formula would be true only for a uniform horizontal velocity profile which would only be available in an infinitely wide tank. Therefore, the length L is converted by a factor which is a function of the ratio of the maximum glass velocity to a calculated average velocity. Again using theory it is shown that the maximum velocity (on the surface) is 1.5 times the average velocity for an infinitely wide channel. The following table illustrates examples of other width to depth ratios; V maximum/V average ratios have been calculated:

| Open channel, W/D: | V maximum/V average |
|---|---|
| 2 | 2.09 |
| 3 | 2.06 |
| 4 | 1.99 |
| 5 | 1.92 |
| 10 | 1.72 |
| 20 | 1.60 |

| Open channel, W/D | V maximum/V average |
|---|---|
| 30 | 1.57 |
| 50 | 1.54 |
| ∞ | 1.50 |

This indicates that a high width to depth ratio is desirable for the most efficient use of the tank's fining zone 15. Since the purpose is to achieve a uniform surface velocity across the width of the tank, it indicates that the bottom of fining zone 15 may be contoured to compensate for edge effects.

The short dwell time of the surface glass in the fining zone 15, obtained with the instant configuration, offers another advantage in the case of volatile glasses. Much less material will be lost by volatilization because of the reduced time spent in the refining zone. This effect is further augmented because of the open connection at the outlet of the finer. Normally there is a submerged throat at this point which stagnates some of the finer surface glasses and aggravates potential cord and knot problems. In the instant invention any scum formed in the finer passes to the distributor and on out of the tank through the overflow.

As shown in FIG. 2, the glass going to the forehearth 35 from distributor 27 passes through a submerged connection or throat 37. Off-composition bottom glass is removed by drain slot 31 upstream of the glass which flows through the submerged throats 37 into the forehearth. Orifices 39 in forehearth 35 allow the best glass to flow to forming devices for further working.

There are numerous other configurations of distributors which embody this same general thinking and are within the true course and scope of the present invention. Alternate embodiments of other distributor configurations are shown in FIGURES 4 and 5.

Thus the present invention increases the output from a glass melting furnace as well as decreases the required glass holding capacity of the furnace. Melting rates are increased with improved and more stable glass quality, thus making possible lower melting costs per pound of product produced. Glass changes may be made more rapidly since a shorter drain time is required. Fill rates are increased because glass will not enter the fining zone until the tank is nearly full, thus the first glass through the tank should be well fined. The present invention decreases surface volatilization because of the uniform increased surface velocity of the glass in the fining zone. The shadow fining zone makes a monolithic bottom and sidewall construction more practical thus reducing the cost of furnace construction.

Although the present invention has been described with respect to certain details of certain embodiments thereof, it is not intended that such details be limitations upon the scope of the invention except insofar as set forth in the following claims.

I claim:

1. A glass-melting furnace comprising a melting zone, a refining zone of shallower depth than that of said melting zone, a bridgewall having at least one submerged throat connecting said melting zone and said refining zone, an unobstructed cooling channel communicating with said refining zone at a location remote from said bridgewall, said cooling channel being provided with an overflow channel adapted to permit the removal of molten surface glass, and at least one forehearth communicating with said cooling channel through a submerged throat.

2. A furnace according to claim 1 which includes a drain slot extending substantially across the bottom of said cooling channel at a location between said refining zone and said forehearth.

3. A furnace according to claim 2 in which said forehearth communicates with said cooling channel at a location intermediate said overflow channel and said drain slot.

4. A furnace according to claim 3 in which said cooling channel is an upwardly open channel.

References Cited

UNITED STATES PATENTS

| | | | |
|---|---|---|---|
| 1,597,440 | 8/1926 | Ferngren | 65—135 |
| 1,810,911 | 6/1931 | Ferngren | 65—134 |
| 1,916,668 | 7/1933 | Howard | 65—134 |
| 3,127,262 | 3/1964 | Allman | 65—347 |
| 3,231,357 | 1/1966 | Pither | 65—347 |
| 3,269,820 | 8/1966 | Day et al. | 65—346 |
| 3,294,512 | 12/1966 | Penberthy | 65—134 |

DONALL H. SYLVESTER, *Primary Examiner.*

ROBERT LINDSAY, Jr., *Assistant Examiner.*

U.S. Cl. X.R.

65—134, 136, 339, 347